United States Patent [19]

Snelling

[11] Patent Number: 5,185,619
[45] Date of Patent: Feb. 9, 1993

[54] ELECTROSTATIC PRINTING METHOD AND APPARATUS EMPLOYING A PYROELECTRIC IMAGING MEMBER

[75] Inventor: Christopher Snelling, Penfield, N.Y.

[73] Assignee: Xerox Corporation, Stamford, Conn.

[21] Appl. No.: 691,774

[22] Filed: Apr. 26, 1991

[51] Int. Cl.⁵ .......................................... G01D 15/06
[52] U.S. Cl. ............................... 346/153.1; 346/76 R; 346/1.1; 346/155; 358/300
[58] Field of Search ............. 346/153.1, 76 R, 76 PH, 346/76 L, 1.1, 155; 358/300

[56] References Cited

U.S. PATENT DOCUMENTS

| | | | |
|---|---|---|---|
| 3,713,822 | 1/1973 | Kiess | 430/87 |
| 3,789,420 | 1/1974 | Claytor et al. | 346/153.1 |
| 3,824,098 | 7/1974 | Bergman et al. | 430/87 |
| 3,899,969 | 8/1975 | Taylor | 101/130 |
| 3,935,327 | 1/1976 | Taylor | 427/19 |
| 4,103,066 | 7/1978 | Brooks et al. | 428/337 |
| 4,357,618 | 11/1982 | Ragland | 346/153.1 X |
| 4,899,196 | 2/1990 | Mahoney | 355/271 |
| 4,935,787 | 10/1990 | Maeda et al. | 355/326 |
| 4,990,931 | 2/1991 | Sato et al. | 346/76 R X |
| 5,079,566 | 1/1992 | Mori | 346/76 PH |

FOREIGN PATENT DOCUMENTS 58-213705 6/1985 Japan .
63-312050 6/1990 Japan .

OTHER PUBLICATIONS

J. G. Bergman et al., "Pyroelectric Copying Process," *Applied Physics Letters*, vol. 21, No. 10, pp. 497–499, Nov. 15, 1972.

Joseph M. Crowley, "Fundamentals of Applied Electrostatics," pp. 137–145, 1986, Wiley & Sons, New York.

Keith S. Pennington et al., "Resistive Ribbon Printing: How It's Done," *Annual Guide to Ribbons & Toner*, pp. 54–62, 1986.

D. Dove et al., "High Resolution Resistive Ribbon Printing for Typesetter Application," *Journal of Imaging Science*, vol. 33, No. 1, pp. 7–10, Jan./Feb. 1989.

Primary Examiner—Benjamin R. Fuller
Assistant Examiner—Randy W. Gibson
Attorney, Agent, or Firm—Duane C. Basch

[57] ABSTRACT

A method and apparatus for printing including the use of a pyroelectric imaging member in a novel fashion to produce prints having improved resolution. The prints are produced by thermally exposing the pyroelectric imaging member in a localized fashion while neutralizing the surface charge and subsequently cooling the exposed surface of the imaging member to generate a latent electrostatic image thereon. Subsequently, the latent image is developed with charged toner particles, and transferred from the pyroelectric member to a substrate through the use of a second thermal treatment which serves to reverse the polarity of the imaging member and thereby eliminate the electrostatic forces attracting the toner particles to the imaging member. The transferred toner image may be simultaneously or subsequently fixed to the substrate by a thermal or other well known fusing treatment.

20 Claims, 3 Drawing Sheets

ELECTROSTATIC PRINTING METHOD AND APPARATUS EMPLOYING A PYROELECTRIC IMAGING MEMBER

Cross reference is hereby made to commonly assigned, copending patent application entitled "PYROELECTRIC DIRECT MARKING METHOD AND APPARATUS," submitted by Christopher Snelling application Ser. No. 07/691,775, filed Apr. 26, 1991, the relevant portions of which are hereby incorporated by reference.

This invention relates generally to an electrostatic copying apparatus utilizing a pyroelectric imaging device, and more particularly to an apparatus which utilizes a pyroelectric image receptor in a novel manner to produce latent electrostatic images and to enable the transfer of such images subsequent to development with charged marking particles.

In the past, polyvinylidene fluoride (PVDF) film and other materials have been known to exhibit pyroelectric effects. For example, it is known that the PVDF films may be heated to induce the formation of an electrostatic charge on the surface of the film. In addition, polarization of the film, where the majority of the dipole moments are permanently aligned, increases the magnitude of the pyroelectric behavior for the film. Alternatively, other materials such as triglycine sulfate (TGS) may be used to produce the electrostatic charge in response to a change in temperature, as described by Crowley in "Fundamentals of Applied Electrostatics" (Wiley & Sons, New York, 1986, pp. 137–145).

For example, U.S. Pat. No. 3,824,098 to Bergman et al. teaches an electrostatic copying device having a polymeric polyvinylidene fluoride film as a medium for producing a patterned electrostatic charge. The patterned electrostatic charge is produced by exposing the film to the image of an object interposed between the film and a light source. The radiant energy of the light source being sufficient to heat the film causing an electrostatic charge pattern of sufficient resolution to enable the charge pattern to be developed by toning the film with electrostatically charged inks. Also disclosed by Bergman et al. in Applied Physics Letters, Vol. 21, No. 10, pp. 497–499, Nov. 15, 1972 is a system capable of producing negative images by neutralizing the pyroelectric element while projecting the image on the pyroelectric material, and then allowing the material to cool down. This resulted in a reversal of the sign of the electrostatic charge produced on the surface of the pyroelectric material.

In a printing system, a uniformly poled pyroelectric material may be selectively heated to form a differential charge pattern which can subsequently be developed. For example, U.S. Pat. No. 3,899,969 to Taylor teaches a method for printing using a pyroelectric material having dipoles that are permanently poled to form a permanent pattern corresponding to a graphic representation. Subsequently, the permanently poled material can be used by heating or cooling to produce a charge pattern representative of the graphic representation, which can then be developed with toner powder, transferred to a sheet of paper, and fused to form a printed page. The heating, toning and fusing process may be repeated, thereby producing multiple copies. In a similar embodiment, U.S. Pat. No. 3,935,327 to Taylor discloses a method for copying a graphic representation using a uniformly poled pyroelectric material. The material is selectively heated to form a differential charge pattern on the material that can be developed with charged toner particles to form a copy of the graphic representation.

Moreover, Japanese Patent No. 60-104965 to Sakai teaches a thermal recording device using a pyroelectric material such as vinylidene polyfluoride. The device moves the pyroelectric material past a heatsensitive head which forms a latent image thereon. The latent image is developed with toner and the developed image is then transferred to paper with the aid of a positively charged transfer member. The paper is then passed between a pair of heated fixing rollers.

Finally, Japanese Patent No. 63-312050 to Okuyama discloses a recorder having an electrostatic latent image carrier with a pyroelectric layer of polyvinylidene fluoride. Electrical current is passed through a heating element in response to an external recording signal. The heat generated by the heating element is transferred to the pyroelectric material, causing the formation of an electrostatic latent image which may be developed by conventional methods. Furthermore, the electrical energy may be modulated to readily form an electrostatic latent image of half tone.

In general the aforementioned references do not address the problem of depletion of the electrostatic charge induced on the surface of the pyroelectric material over time. More specifically, it is believed that this depletion in charge potential is the result of internal charge transport through the hot film. Therefore, the rapidity of the development process becomes important due not only to the charge depletion, but also due to the negative effects of thermal diffusion on the image resolution. Furthermore, the references do not disclose the use of the pyroelectric effect as an active component of the electrostatic transfer process, where the developed image is transferred to a substrate material.

From the foregoing discussion, one can easily see that it would be extremely valuable to be able to produce a printing or copying system utilizing a pyroelectric material as the electrostatic imaging member. Such a material would reduce the need for high power circuits typically found in the charging and transfer sub-systems of most xerographic printing machines. Moreover, the pyroelectric imaging system may be produced using available thermal print head technology, while eliminating the need for thermally responsive substrate materials. In other words, use of a pyroelectric imaging member and electrostatic development techniques would enable the use of existing thermal print head technology to produce low cost plain paper printing and copying systems.

Accordingly, and in accordance with the present invention, a method and apparatus for printing is disclosed which includes the use of a pyroelectric imaging member in a novel fashion to produce prints having improved resolution. The prints are produced by thermally exposing the pyroelectric imaging member in a localized fashion and neutralizing the charge prior to cooling the imaging member to generate a latent electrostatic image thereon. Subsequently, the latent image is developed with charged toner particles to form a developed image which is then transferred from the pyroelectric member to a substrate through the use of a second thermal treatment. The second thermal treatment serves to reverse the charge polarity of the imaging member and thereby eliminate the electrostatic attraction of the toner particles to the imaging member.

The transferred toner image is then simultaneously or subsequently fixed to the substrate by a thermal or other well known fusing treatment.

Other advantages of the present invention will become apparent after studying the following description taken in conjunction with the accompanying drawings wherein the same reference numerals have been applied to like parts and wherein.

While the present invention will hereinafter be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
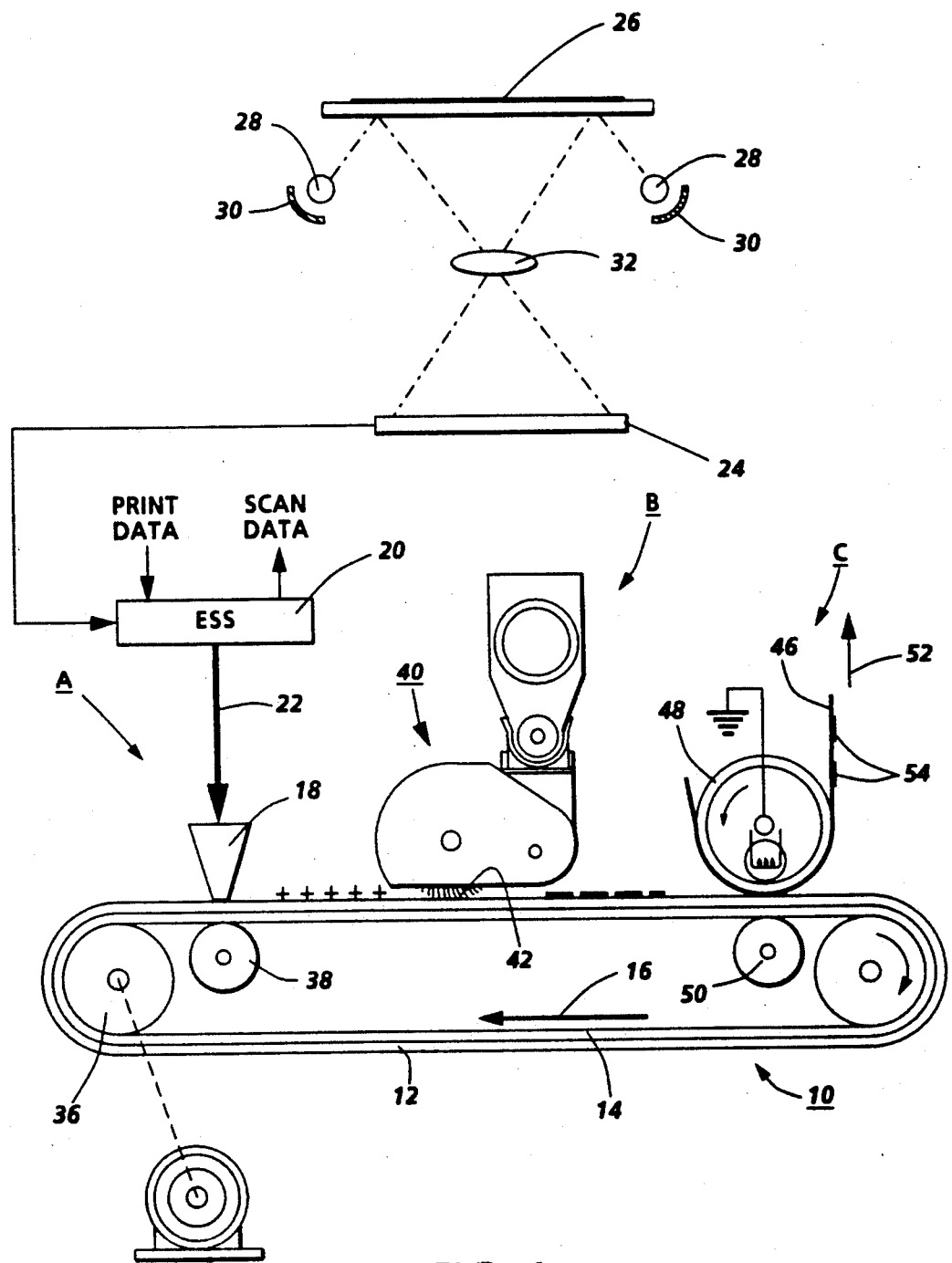
FIG. 1 is a schematic elevational view of a multifunction printing machine incorporating the present invention.

For a general understanding of a multifunctional printing machine in which the features of the present invention may be incorporated, reference is made to FIG. 1, which schematically depicts the various components thereof. Although the apparatus for producing the latent electrostatic image and transferring the developed image to copy sheets is particularly well adapted for use in the machine of FIG. 1, it should be evident from the following discussion that it is equally well suited for use in a wide variety of printing, duplicating and facsimile devices.

In the multifunctional printing machine of FIG. 1, a belt 10 having a pyroelectrically responsive layer 12 and a conductive base layer 14, is rotated in the direction indicated by arrow 16 through the various processing stations for producing a copy of an original document by drive roll 36. Initially, belt 10 is rotated through exposure station A, which employs thermal print stylus 18, to selectively heat layer 12 thereby causing localized heating of the layer. Thermal coupling between belt 10 and stylus 18 is assured by pressure roll 38 which maintains a normal force on the rear of belt 10. In response to the thermal activation of layer 12, by thermal print stylus 18, the pyroelectric layer generates an electrostatic latent image on the surface thereof.

Thermal print stylus 18 is an array typically used for the production of prints on thermally sensitive paper. For example, the thermal array (Part No. FFPXA07132, Part Name: HEAD) used in the "Panasonic Apogee/1 (FN-P300)" desktop digital copier has been shown to be suitable for producing the temperature increase necessary to illustrate the pyroelectric effect of layer 12. Alternatively, a film type thermal print head, may be used as the thermal print stylus. For example, the "KF Series-Thick Film Thermal Print Heads" from Rohm Co., Ltd. would be suitable for producing the required heat transfer necessary in the present invention.

The individual elements of stylus 18 are driven by electronic subsystem (ESS) 20, via input lines 22, in accordance with imaginal data received from either a print source or from a commonly known charge coupled device (CCD) 24. The print source may be any suitable raster input generation system. Likewise, CCD 24 is a well known rasterizing input device capable of generating a rasterized representation of an image contained on original document 26. More specifically, original document 26 is illuminated by lights 28 and reflectors 30, thereby causing light to be reflected from the surface of the document and through lens 32 which focuses the light onto CCD 24. Subsequently, the output of the individual sensors of CCD 24 is transferred to ESS 20 for output to thermal stylus 18, or optionally as electronic scan data. ESS 20 may also act as an image processing device, capable of correcting and/or modifying the input data in accordance with a set of predefined requirements.

In an alternative embodiment, the thermal activation of the pyroelectric imaging belt, belt 10, may be achieved by thermally activating a metallic layer within the belt. Belt 10 may have the characteristics of a resistive ribbon structure as described by Pennington et al. in "Resistive Ribbon Printing: How It's Done," *Annual Guide to Ribbons & Toner*, 1986, Dove et al. in "High Resolution Resistive Ribbon Printing for Typesetter Application," Journal of Imaging Science, Volume 33, No. 1, Jan./Feb. 1989, and by Brooks et al. in U.S. Pat. No. 4,103,066, the relevant portions of these references being hereby incorporated by reference. Generally, the resistive ribbon structure would underlie pyroelectric layer 12, and would replace layer 14 as illustrated in the drawings.

Specifically, this alternative embodiment would employ a resistive ribbon substrate layer (not shown) beneath pyroelectric layer 12, so that the resistive ribbon substrate, upon activation by point contact electrodes (not shown), would produce the necessary localized heating of the substrate and adjacent pyroelectric layer. Such a structure would generally employ a pyroelectric top layer equivalent to layer 12, an underlying metallic inter-layer, and an electrically conductive substrate layer on the bottom. Application of high current density to the underside of belt 10, via pin-type print head electrodes, will result in highly localized heating within the metallic inter-layer above the electrodes and, thus, the simultaneous localized heating of the pyroelectric layer. Generally, the print head electrodes would be driven in a manner similar to the individual elements of stylus 18, by a rasterized image data source, as previously described. This embodiment would enable higher process speeds and improved image resolution as there would be much less loss of thermal energy as compared to the contact type thermal print stylus. The localized heating of the pyroelectric top layer would result, as previously described, in localized electrostatic charge patterns on the surface of the pyroelectric layer. The resultant charge would then be neutralized, by grounding the surface against a conductive roll or similar means disposed upon the upper surface of belt 10. For example, roll 38 may be an electrically conductive roll which is biased against the upper surface of belt 10 to neutralize the initial electrostatic charge due to heating of the pyroelectric layer. A conductive roll biased against the top of surface of the belt would also assure contact of the underside of the belt with the array of point contact electrodes. The highly localized heating possible with the resistive ribbon technique would enable the immediate cooling of the pyroelectric layer 12, resulting in a longer lasting latent electrostatic image.

Having a latent electrostatic image produced thereon by one of the above techniques, belt 10 continues to be rotated by drive roll 36, the charged portion of layer 12 passing through development station B, where development unit 40 develops the electrostatic latent image corresponding to the informational areas of the original document. For example, development station B would normally include a developer unit, indicated generally by reference numeral 40, having a housing for a supply of development material. The developer material generally comprises magnetic carrier granules with toner particles adhering triboelectrically thereto. Developer unit 40 is preferably a magnetic brush development system where the developer material is moved through a magnetic flux field causing a brush 42 to form, whereby the latent electrostatic image on pyroelectric layer 12 is developed by bringing layer 12 into contact with the brush. In this manner, the toner particles are electrostatically attracted to the latent image thereby forming a developed toner image on layer 12. In an alternative embodiment, a liquid toner development system may be used by replacing the magnetic brush with a flock covered roll saturated with liquid developer.

Coincident with development of the latent image, a copy sheet is advanced to transfer station C. In operation, sheet 46 is advanced from a stack (not shown) and fed into position, so as to register the sheet with the developed toner image contained on layer 12. Generally, sheet 46 is advanced by feed rollers (not shown) which deskew and feed the sheet until sufficiently introduced into the nip region formed between heated transfer roll 48 and layer 12 at transfer station C.

Transfer station C includes heated transfer roll 48, which, in conjunction with pressure roll 50 maintains the nip through which belt 10 and copy sheet 46 pass. Through the longitudinal application of heat to the nip forming portion of roll 48, the developed image is transferred and fixed to the copy sheet. Subsequently, the sheet is stripped from layer 12 by, for example, the beam strength of the sheet and advanced in the direction of arrow 52, having image areas 54 fused thereto.

After separation of the copy sheet from pyroelectric layer 12, residual toner may remain on the surface of the pyroelectric layer, thereby requiring a cleaning operation for removal of the residual toner. While not shown, such a cleaning operation may include a corona generating device (not shown) for neutralizing the electrostatic charge remaining on the pyroelectric layer, as well as, that of the residual toner particles. The neutralized toner particles may then be cleaned from pyroelectric layer 12 by a rotatably mounted fibrous brush (not shown) in contact therewith.

Figure 2:
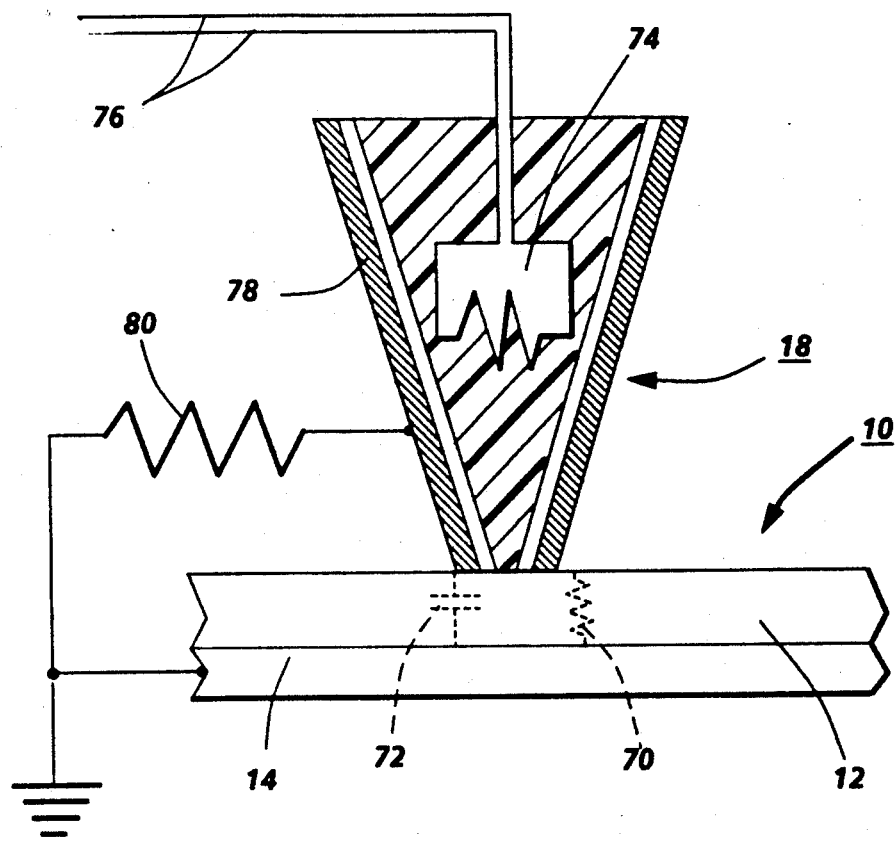
FIG. 2 is an enlarged equivalent circuit representation of the thermal print head and pyroelectric member of FIG. 1.
Figure 3:
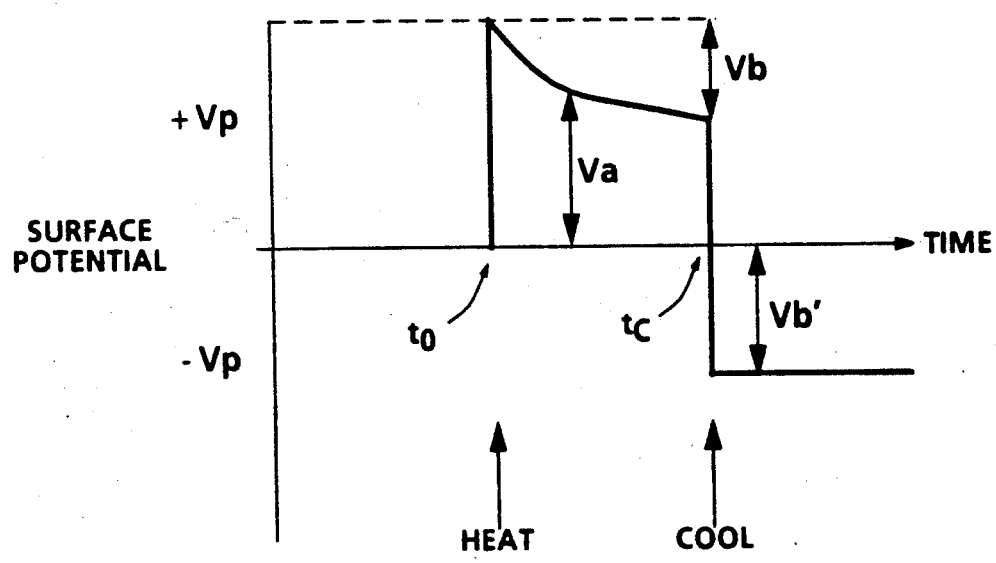
FIG. 3 is a graphical representation of the electrical behavior of the pyroelectric material.

Referring now to FIG. 2, wherein the thermal print head and pyroelectric belt of exposure station A are illustrated schematically in an enlarged equivalent circuit representation, belt 10 is depicted as having a pyroelectric layer 12 which has an internal resistance $R_{int}$ represented by resistor 70. In addition, the pyroelectric layer would be characterized electrically as having an internal capacitance $C_{int}$, represented by capacitor 72, where the dissipation of charge contained on the surface of layer 12 is regulated by the $R_{int} \cdot C_{int}$ time constant determined from the internal resistance and capacitance of the pyroelectric layer. As illustrated in FIG. 3, the voltage on the surface ($V_a$) at any time after initial heating ($t_0$) is a function of the initial voltage generated by heating and the subsequent dissipation of charge through layer 12, over time, in accordance with the RC time constant.

More specifically, the initial voltage of the localized heated regions on the surface of pyroelectric layer 12 are a function of the pyroelectric coefficient of the layer and the change in temperature of the localized regions. Support for the pyroelectric effect of the material, and the mathematical basis for determination of the resultant surface charge are found in the discussion of piezo- and pyroelectricity by Crowley, supra, the relevant portions being hereby incorporated by reference. In one embodiment, the pyroelectric material used is a polymer material based polyvinylidene fluoride (PVDF) which is used as the base resin for the "KYNAR TM PIEZO FILM" manufactured by Atochem North America, (formerly Pennwalt Corporation). The pyroelectric coefficient ($K_{py}$) of the material is in the range of 2.3–2.7 nC/cm$^2$°K. Accordingly, the temperature change required to produce a charge density ($\Delta P_{se}$) similar to xerographic photoreceptor values (i.e. 50 nC/cm$^2$) is determined as follows:

$$\Delta T = \Delta P_{se}/K_{py},$$

where $\Delta T$ represents the required change in temperature. For the pyroelectric coefficient range of the Kynar TM film, the required temperature change is in the range of 18.5° to 22° K. (33° to 40° F.), to produce a 500 volt potential on the surface of a 100$\mu$ PVDF film. It should be noted that suitable charge potentials may be produced with both larger and smaller temperature changes, and that the charge potential required is primarily a function of the charge required to attract toner or liquid developer particles to the charged surface. Therefore, use of a thermal print head capable of producing localized temperature changes in excess of 70° C. would be acceptable, and may in fact increase the latitude of the process by enabling a wider range of development materials to be used. Commonly known thermal print head designs would appear to be well suited for use in the exposure station of the present invention. Furthermore, as previously described, acceptable temperature gradients may be produced through the use of resistive ribbon embodiment which employ a resistive inter-layer beneath the pyroelectric layer of belt 10.

Thermal print stylus 18 has a plurality of internal resistive elements 74, each being driven by an externally controlled current source. For explanation purposes, a single resistive element 74 is shown in the figure, wherein the element is activated via lines 76, however, in practice a series of these elements are placed in a linear array extending across the width of pyroelectric layer 12. In addition, surface 78 of stylus 18 is sufficiently conductive to enable thermal print stylus 18 to commutatively neutralize the charge produced as a result of the localized heating of layer 12 by elements 74. Surface 78 is illustrated as being connected to ground through external resistor 80, and as such provides a path suitable for neutralization of the charge on the surface of layer 12. More importantly, this external grounding path enables a more rapid neutralization of the charge on the surface of layer 12 as compared to the internal charge transport through the layer. It should be noted that additional methods for neutralizing the charge may be available, but at this time a preferred embodiment utilizes the stylus in a commutative fashion to facilitate the dissipation of the electrostatic charge.

Once again referring to FIG. 3, after the initial heating of the pyroelectric surface at time $t_0$, initial potential $V_a$ appears across the pyroelectric layer, the magnitude of which is a function of the temperature change ($\Delta T$) and pyroelectric coefficient ($K_{py}$) of the layer. The polarity of $V_a$ is a function of the permanent poling direction of the pyroelectric layer. Unfortunately, as illustrated in the figure, this potential decreases over time due to internal charge transport through the hot film. In addition, image resolution, or sharpness, decreases rapidly with time as the heat pattern diffuses laterally in the film. Therefore, rapidity of the development process is important for processes which use the charge potential generated upon initial heating to attract the developer material. However, the present invention utilizes an alternative approach which results in a more stable charge on the surface of pyroelectric layer 12. If the film is subsequently cooled to ambient (room) temperature at time $t_c$, a reversed polarity image potential ($V_b'$) appears on the surface of the pyroelectric layer, where $V_b'$ is equal in magnitude and opposite in polarity to the net charge leakage ($V_b$) that has occurred during the time the film is held at the elevated temperature. Moreover, because the reversed polarity charge exists at the relatively cool ambient temperature, it is more stable over time.

The behavior illustrated in FIG. 3, demonstrates that it is desirable to maintain the electrostatic latent image on the surface of the pyroelectric layer while the layer is maintained at an ambient temperature. Therefore, the present invention seeks to maximize the charge leakage or dissipation of charge from the surface of the pyroelectric layer while hot, and then to subsequently cool the layer to generate an oppositely charged and stable electrostatic image. By commutatively neutralizing the charge with stylus surface 78 of FIG. 2, charge dissipation is maximized beyond that available from normal leakage through the hot layer. This results in the maximization of charge leakage $V_b$, so that upon cooling the film to ambient temperature, the magnitude of $V_b'$ will also be maximized. An additional advantage of the present process is the minimization of thermal diffusion effects within the pyroelectric layer, which serve to reduce the resolution of the resulting latent electrostatic image. By utilizing short heating and charge commutation times, the present process is capable of producing latent electrostatic images with improved resolution over those previously available using a pyroelectric imaging member. Furthermore, the ability of the pyroelectric layer to maintain the latent electrostatic image for long periods of time at ambient temperature combined with a demonstrated ability to produce multiple prints from the same electrostatic image make this process particularly well suited for duplicating applications.

Figure 4A:
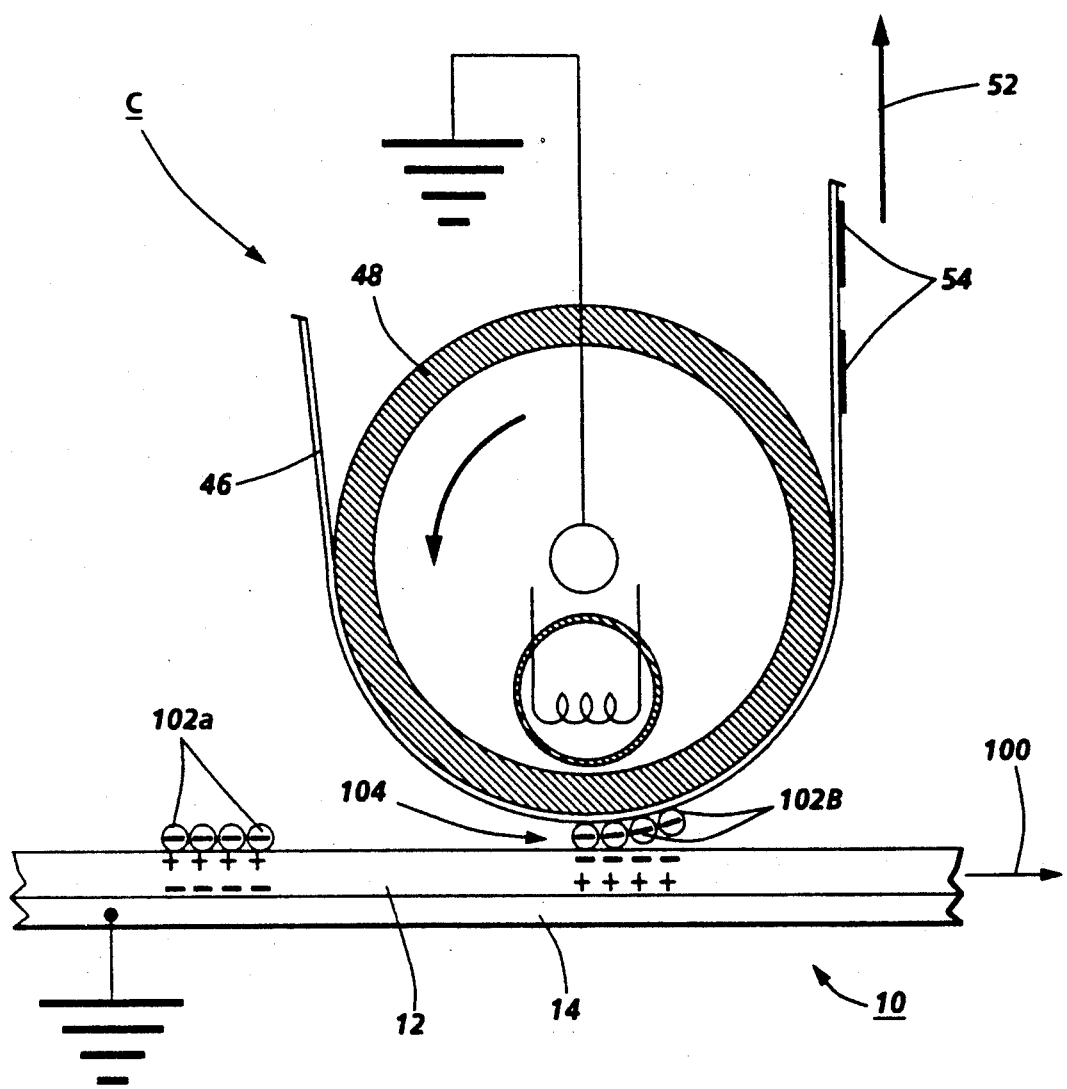
FIG. 4A is enlarged schematic illustration of the pyroelectric transfer process of the present invention.

Referring now to FIG. 4A, wherein belt 10 is shown passing through transfer station C, pyroelectric layer 12 enters the transfer station from the left having a positive charge on the upper surface thereof. The positive charge is used to attract negatively charged toner particles 102a to the upper surface of layer 12. Subsequently, as belt 10 moves in the direction of arrow 100, the developed toner image, made up of toner particles 102b, is moved through transfer region 104, where heated transfer roll 48 causes copy sheet 46 to remain in contact with the moving belt. Heat is supplied to transfer roll 48 by an internal heating element as commonly used in fuser rolls well known in the xerographic arts. The transfer roll would be maintained at a temperature of about 80° C. Due to the relative contact between transfer roll 48, copy sheet 46 and belt 10 in transfer region 104, heat is conducted from heated transfer roll 48 to belt 10. Upon reheating, the pyroelectric layer generates an opposite polarity charge, resulting in a negative charge polarity on the upper surface of layer 12. In turn, the change in surface charge polarity encourages toner particles 102b to be electrostatically transferred from the surface of pyroelectric layer 12 to the surface of copy sheet 46. FIG. 1 illustrates the use of pressure roll 50 to produce a nip within transfer region 104, whereby the toner particles would not only be transferred, but also fixed to copy sheet 46 at the same time, thereby producing fused image areas 54. In an alternative embodiment, the source of thermal energy may be provided from the underside of the belt, thereby producing a similar transfer effect. After transfer of particles 102b to copy sheet 46, a backup roll (not shown) may be used to cause the toner particles to fuse with the copy sheet, again, resulting in fused image areas 54.

Figure 4B:
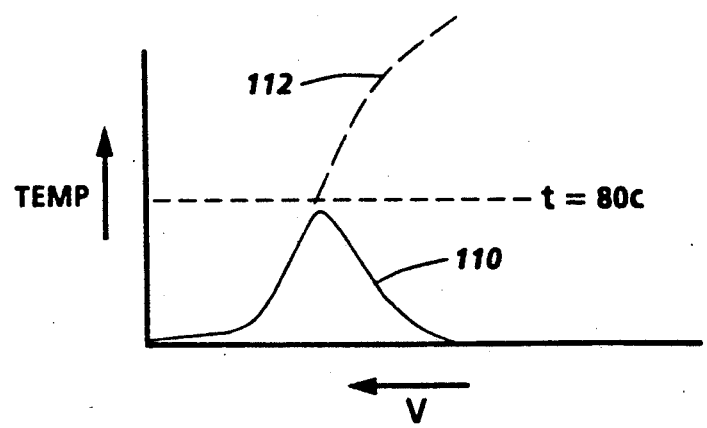
FIG. 4B is a graphical illustration of the temperature profiles of the pyroelectric and substrate materials during the transfer process illustrated in FIG. 4A.

Referring also to FIG. 4B, wherein the temperature profile of the pyroelectric layer 12 is illustrated by curve 110, the pyroelectric layer undergoes a temperature increase sufficient to cause the reversal of charge polarity on its surface. It is important to note that the temperature of the PVDF layer must be limited to less than 80° C. to prevent depoling of the material. Therefore, after transfer of the toner particles, the PVDF is allowed to cool, while the copy sheet, represented by curve 112, maintains contact with the heated transfer roll, causing the temperature to continue to increase to a level suitable to cause the toner to fuse to the copy sheet. With an 80° C. maximum temperature, a free surface charge potential of approximately 1500 volts will be produced, sufficient to cause the electrostatic transfer of the toner particles which are subsequently attracted to the surface of copy sheet 46 by the grounded surface of heated transfer roll 48.

Use of this novel transfer technique is enabled by the reverse image polarity of the latent electrostatic image that results from the aforementioned exposure step. In conjunction the novel uses of the pyroelectric imaging member incorporated in the present invention serve to reduce or eliminate the requirements for high voltage power supplies, as well as, charge and transfer corotrons generally found in xerographic printing systems. Furthermore, use of existing thermal print head technology enables more compact and less costly systems while avoiding the high cost of thermally sensitive paper normally used with such systems. The present invention is therefore particularly well suited for use in facsimile, printing, electronic reprographic and multi-functional (i.e. facsimile, printing, and copying) systems, due to the aforedescribed advantages.

In an alternative embodiment, pyroelectric belt member 10 of the present invention may be employed in a copier utilizing intermediate transfer technology. For example, U.S. Pat. No. 4,899,196 to Mahoney and U.S. Pat. No. 4,935,787 to Maeda et al., both of which are hereby incorporated by reference, disclose copiers which employ this technology. In the intermediate transfer process, an intermediate image is developed on a photosensitive member and transferred to an intermediate member, described by Maeda et al. as a belt, where multiple intermediate images may be overlayed, before being transferred to a copy sheet as a final or composite image.

More specifically, the poled pyroelectric belt of the present invention may be employed as the intermediate member in the copier described by the Mahoney patent. Upon uniformly heating, neutralizing, and cooling the poled pyroelectric layer, a uniform electrostatic charge, suitable to transfer the developed image from the photosensitive member to the pyroelectric intermediate member, could be produced. Subsequently, the composite image of marking particles may be transferred to a copy sheet using the process described with respect to FIGS. 4A and 4B, wherein the pyroelectric transfer member, represented by belt 10, is reheated to enable the release of the attracted marking particles. Use of a pyroelectric intermediate transfer member would simplify the requirements for electrostatic transfer of the marking particles. Therefore, transfer corotrons and associated power supplies could be reduced or eliminated from a copier employing a pyroelectric intermediate transfer member.

Thus, a method and apparatus is disclosed that facilitates printing or copying with a pyroelectrically responsive medium. The method and apparatus include a pyroelectric member, responsive to localized heating from a thermal stylus, or internal resistive ribbon layer, and means for subsequently developing a latent electrostatic image prior to transfer of the developed image, as facilitated by reheating the pyroelectric member. Alternatively, the pyroelectric member may be employed as an intermediate transfer member in a multi-color xerographic system, wherein the pyroelectric characteristics are utilized to facilitate transfer of developed toner images from one medium to another.

The present invention has been described in detail with particular reference to specific embodiments thereof; however, it should be understood that variations and modifications can be effected within the spirit and scope of the instant invention.

I claim:

1. An electrostatic printing apparatus, comprising:
   a pyroelectric imaging member suitable for maintaining an electrostatic charge on a surface thereof;
   means for thermally exposing said pyroelectric imaging member, so that localized areas of the pyroelectric member may be heated, thereby resulting in localized electrostatically charged areas on the surface of said pyroelectric imaging member;
   development means for placing the surface of said pyroelectric imaging member in contact with a developer mixture having charged marking particles therein, thus producing a developed image thereon which corresponds to the electrostatically charged areas;
   means for transferring the developed image to a suitable substrate, said transferring means including means for presenting the substrate in registration with the developed image, means for thermally activating the pyroelectric imaging member to cause a reversal of the polarity of the electrostatically charged areas, so that the charged marking particles are no longer electrostatically attracted to the surface of the pyroelectric imaging member, and means for attracting the charged marking particles to a surface of the substrate.

2. The electrostatic printing apparatus of claim 1 wherein the means for thermally activating the pyroelectric imaging member to cause a reversal of the polarity of the electrostatically charged areas, comprises:
   a heated roll having a generally uniform temperature gradient across a portion of a longitudinal surface thereof; and
   a backup roll, biased in the direction of said heated roll to form a nip therebetween, through which the substrate and said pyroelectric imaging member are passed, said pyroelectric imaging member being heated by said heated roll, thereby reversing the polarity of the electrostatically charged areas and enabling the transfer of the charged marking particles to the surface of the substrate.

3. The electrostatic printing apparatus of claim 2 wherein nip formed between said heated roll and said backup roll is able to transfer sufficient heat to cause the plastic flow of the marking particles, thus causing the marking particles to become permanently affixed to said substrate.

4. An electrostatic printing apparatus, comprising:
   a pyroelectric imaging member suitable for maintaining an electrostatic charge on a surface thereof;
   means for thermally exposing said pyroelectric imaging member, said exposing means including an array of thermal elements disposed in contact with said pyroelectric imaging member, said thermal elements being selectively driven to heat localized areas of the surface of the pyroelectric imaging member, thereby resulting in localized charged areas on the surface of the pyroelectric imaging member, conductive means for neutralization of the localized charge from the heated surface of the pyroelectric member, and means for cooling the surface of the pyroelectric member, resulting in a latent electrostatic image having a polarity opposite that initially generated by the thermal elements;
   development means for placing the surface of said pyroelectric imaging member in contact with a developer mixture having charged marking particles therein, thus producing a developed image thereon which corresponds to the electrostatically charged areas; and
   means for transferring the developed image to a suitable substrate, said transferring means including means for presenting the substrate in registration with the developed image, means for thermally activating the pyroelectric imaging member to cause a reversal of the polarity of the eletrostatically charged areas, so that the charged marking particles are no longer electrostatically attracted to the surface of the pyroelectric imaging member, and means for attracting the charged marking particles to a surface of the substrate.

5. The electrostatic printing apparatus of claim 4, wherein the pyroelectric member comprises a pyroelectrically responsive layer, and an adjacent electrically conductive layer.

6. The electrostatic printing apparatus of claim 5, wherein the pyroelectrically responsive layer is selected from the group consisting of polyvinylidene fluoride, and triglycine sulfate.

7. The electrostatic printing apparatus of claim 1 wherein the pyroelectric imaging member, comprises:
   a top layer of pyroelectrically responsive material; and
   a resistive ribbon bottom layer, said resistive ribbon layer being responsive to a localized current source, wherein said resistive ribbon layer will cause the localized heating of said top layer in response to the current.

8. The electrostatic printing apparatus of claim 7 wherein the means for thermally exposing said pyroelectric imaging member, comprises:

an array of print head electrodes disposed in contact with the underside of said pyroelectric member for applying a high current density thereto, the current resulting in highly localized heating within the metallic inter-layer and the simultaneous localized heating of the pyroelectric layer, said array being selectively driven from a rasterized image data source, wherein localized heating of the pyroelectric layer results in the production of localized charged areas of a first polarity on the surface thereof;

conductive means for neutralization of the localized charge produced on the heated surface of the pyroelectric layer; and means for cooling said pyroelectric member, wherein upon cooling, a latent electrostatic image having a polarity opposite said first polarity is produced upon the surface of the pyroelectric layer.

9. An electrostatic printing apparatus, comprising:

a poled pyroelectric member suitable for maintaining an electrostatic charge on a surface thereof, said charge representing a latent electrostatic image;

an array of thermal elements disposed in contact with said pyroelectric member, said thermal elements being selectively driven to heat localized areas of the surface of the pyroelectric member to a temperature below a critical poling temperature of the pyroelectric member, thereby producing localized charged areas on the surface of the pyroelectric member;

conductive means for neutralization of the localized charge from the heated surface of the pyroelectric member;

means for cooling the surface of the pyroelectric member, resulting in a latent electrostatic image having a polarity opposite that initially generated by the thermal elements;

development means for exposing the latent image to a developer mixture having charged marking particles therein, and thereby producing a developed image on the surface of the pyroelectric member; and means for transferring the developed image to a suitable medium.

10. An electrostatic printing apparatus comprising:

a poled pyroelectric member suitable for maintaining an electrostatic charge on a surface thereof, said charge representing a latent electrostatic image;

an array of thermal elements disposed in contact with said pyroelectric member, said thermal elements being selectively driven to heat localized areas of the surface of the pyroelectric member, thereby producing localized charged areas on the surface of the pyroelectric member;

conductive means for neutralization of the localized charge from the heated surface of the pyroelectric member;

means for cooling the surface of the pyroelectric member, resulting in a latent electrostatic image having a polarity opposite that initially generated by the thermal elements;

development means for exposing the latent image to a developer mixture having charged marking particles therein, and thereby producing a developed image on the surface of the pyroelectric member; and means for transferring the developed image to a suitable medium, said transferring means including means for presenting the medium in registration with the developed image, means for thermally activating the pyroelectric member to cause a reversal in the polarity of the electrostatic image, so that the charged marking particles are no longer electrostatically attracted to the surface of the pyroelectric member, and means for attracting the charged marking particles to a surface of the medium.

11. The electrostatic printing apparatus of claim 10 further comprising:

means, acting in conjunction with said thermal activation means, for fixing the charged marking particles to the surface of the medium.

12. The electrostatic printing apparatus of claim 11, wherein the pyroelectric member comprises a first polyvinylidene fluoride layer, and an adjacent electrically conductive layer.

13. The electrostatic printing apparatus of claim 11, wherein the conductive means is associated with the array of thermal elements and contacts the surface of the pyroelectric member so that the charge may be commutatively dissipated to a system ground.

14. A method of producing a latent electrostatic image on a pyroelectric imaging member in an electrostatic printing apparatus, including the steps of:

a) locally heating the pyroelectric imaging member to expose selective portions of a surface of the member, thereby producing localized regions of charge on the exposed surface thereof;

b) immediately depleting said localized charge to neutralize the charge on the previously exposed surface of the pyroelectric imaging member; and c) cooling the exposed surface, thereby causing the pyroelectric imaging member to generate the latent electrostatic image on the surface thereof.

15. A method of transferring a developed image of electrostatically charged particles having a first polarity on the surface of a pyroelectric imaging member, to a copy substrate including the steps of:

a) bringing the developed image on the surface of the pyroelectric imaging member into close proximity with the copy substrate; and b) heating the pyroelectric imaging member to induce a charge on the surface of the pyroelectric imaging member, said charge being opposite in polarity to the first polarity, and being of sufficient magnitude to cause the charged particles to be attracted to the copy substrate.

16. The method of claim 15, further including the step of:

c) concurrently heating the transferred marking particles to a temperature sufficient to initiate the plastic flow of the marking particles, thus causing the marking particles to become permanently affixed to the copy substrate.

17. A method of producing a copy on a copy substrate in an electrostatic printing apparatus having a pyroelectric imaging member, including the steps of:

a) selectively heating the pyroelectric imaging member to expose localized portions of a surface of the member, thereby producing localized regions of charge on the exposed surface thereof;

b) depleting said localized regions of charge to neutralize the regions of charge on the previously exposed surface of the pyroelectric imagining member;

c) cooling the exposed surface, thereby causing the pyroelectric imaging member to generate a reverse polarity latent electrostatic image correlating to the depleted regions on the surface thereof;

d) exposing the latent electrostatic image to a developer material, suitably attracted by the reverse polarity latent electrostatic image, to produce a developed image on the surface of the pyroelectric imaging member;

e) bringing the developed surface of the pyroelectric imaging member into close proximity with the copy substrate; and f) heating the pyroelectric imaging member to induce a second charge on the surface of the pyroelectric member, said second charge being opposite in polarity to the reverse polarity latent electrostatic image, and of sufficient magnitude to cause the developer material to be transferred to the copy substrate.

18. An electrostatic printing apparatus, comprising:

a pyroelectric member suitable for maintaining an electrostatic charge on a surface thereof, said charge representing a latent electrostatic image;

an array of thermal elements disposed in contact with said pyroelectric member, said thermal elements being selectively driven to heat localized areas of the pyroelectric member, thereby resulting in localized charged areas on the surface of the pyroelectric member;

conductive means for neutralization of the localized charged areas from the heated surface of the pyroelectric member;

means for cooling the surface of the pyroelectric member resulting in a latent electrostatic image having a polarity opposite of, and correlating to, the charged areas initially generated by the thermal elements;

development means for exposing the latent image to a developer mixture having charged marking particles therein, and thereby producin a developed image on the surface of the pyroelectric member;

means for presenting a substrate in registration with the developed image;

means for thermally activating the pyroelectric member to cause a reversal in the polarity of the electrostatic image, so that the charged marking particles are no longer electrostatically attracted to the surface of the pyroelectric member;

means for attracting the charged marking particles to a surface of the substrate; and means, acting in conjunction with said thermal activation means, for fixing the charged marking particles to the surface of the substrate.

19. A multifunctional printing apparatus having means for receiving and storing an electronic image by facsimile transmission, means for generating and storing an electronic representation of an original document, means for receiving and storing an electronic representation of a document to be printed, and means to print the stored electronic images, comprising:

a pyroelectric member suitable for maintaining electrostatic charges on a surface thereof, said charges forming a latent electrostatic image;

an array of thermal elements disposed in contact with said pyroelectric member, said thermal elements being selectively driven to heat localized areas of the pyroelectric member, thereby resulting in localized charged areas on the surface of the pyroelectric member;

conductive means for neutralization of the localized charged areas from the heated surface of the pyroelectric member;

means for cooling the surface of the pyroelectric member resulting in a latent electrostatic image having a polarity opposite of, and correlating to, the charged areas initially generated by the thermal elements;

development means for exposing the latent image to a developer mixture having charged marking particles therein, and thereby producing a developed image on the surface of the pyroelectric member;

means for presenting a substrate to be printed in registration with the developed image;

means for thermally activating the pyroelectric member to cause a reversal in the polarity of the electrostatic image, so that the charged marking particles are no longer electrostatically attracted to the surface of the pyroelectric member; and means for attracting the charged marking particles to a surface of the substrate; and means, acting in conjunction with said thermal activation means, for fixing the charged marking particles to the surface of the substrate.

20. A printing apparatus for producing composite images on output sheets, with the composite images consisting of a plurality of intermediate images, comprising:

an image carrying surface;

means for placing at least one toned intermediate image on said image carrying surface;

a continuous, pyroelectrically responsive surface closely positioned to said image carrying surface;

means for transferring the intermediate images from said image carrying surface to said continuous, pyroelectrically responsive surface in registration to form a composite image; and means for transferring the composite image on said continuous, pyroelectrically responsive surface to an output sheet.

* * * * *